US010440168B2

(12) United States Patent
Endo

(10) Patent No.: US 10,440,168 B2
(45) Date of Patent: Oct. 8, 2019

(54) COMMUNICATION DEVICE TO TRANSMIT DATA WITH REDUCED POWER CONSUMPTION

(71) Applicant: CASIO COMPUTER CO., LTD., Shibuya-ku, Tokyo (JP)

(72) Inventor: Norio Endo, Fuchu (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/961,102

(22) Filed: Apr. 24, 2018

(65) Prior Publication Data
US 2018/0367658 A1 Dec. 20, 2018

(30) Foreign Application Priority Data

Jun. 19, 2017 (JP) .................................. 2017-119597

(51) Int. Cl.
*H04W 4/80* (2018.01)
*H04W 28/02* (2009.01)
*H04W 4/00* (2018.01)
*H04M 1/725* (2006.01)
*H04Q 9/00* (2006.01)

(52) U.S. Cl.
CPC ............ *H04M 1/7253* (2013.01); *H04Q 9/00* (2013.01); *H04Q 2209/43* (2013.01); *H04Q 2209/88* (2013.01)

(58) Field of Classification Search
CPC ......... H04W 4/00; H04W 76/10; H04W 4/80; H04W 28/02; H04W 28/0221; H04W 76/02
See application file for complete search history.

(56) References Cited

U.S. PATENT DOCUMENTS 9,983,724 B2 * 5/2018 Eim ...................... G06F 1/163
10,064,205 B2 8/2018 Yamada et al.
2014/0106677 A1 * 4/2014 Altman .................. H04B 1/385
455/41.2
2014/0323048 A1 * 10/2014 Kang ..................... H04W 4/80
455/41.2

(Continued)

FOREIGN PATENT DOCUMENTS

JP 2005160726 A 6/2005
JP 2014187467 A * 10/2014 ........... H04L 67/125
JP 2015513066 A 4/2015

(Continued)

OTHER PUBLICATIONS

Japanese Office Action dated Jul. 2, 2019 (and English translation thereof) issued in counterpart Japanese Application No. 2017-119597.

*Primary Examiner* — Blane J Jackson
(74) *Attorney, Agent, or Firm* — Holtz, Holtz & Volek PC

(57) ABSTRACT

A communication device transmits a plurality of types of data to an external device, and the communication device includes: a wireless communication unit 15 configured to communicate with the external device; a near field communication unit 16 configured to communicate with the external device and consuming less power; and a CPU 11 configured to set priority to a plurality of types of data and let the near field communication unit 16 with reduced power consumption transmit the data having predetermined priority to the external device.

15 Claims, 11 Drawing Sheets

(56) References Cited

U.S. PATENT DOCUMENTS

2016/0127559 A1* 5/2016 Baek .................. G06F 21/35
                                                              455/417
2016/0378083 A1   12/2016 Okada

FOREIGN PATENT DOCUMENTS

| JP | 2016134734 A | 7/2016 |
| JP | 2016181812 A | 10/2016 |
| JP | 2017012277 A | 1/2017 |
| JP | 2017012661 A | 1/2017 |
| WO | 2015072343 A1 | 5/2015 |

* cited by examiner

COMMUNICATION DEVICE TO TRANSMIT DATA WITH REDUCED POWER CONSUMPTION

CROSS-REFERENCE TO RELATED APPLICATIONS

This application is based upon and claims the benefit of priority from the prior Japanese Patent Application No. 2017-119597, filed on Jun. 19, 2017, the entire contents of which are incorporated herein by reference.

FIELD OF THE INVENTION

The present invention relates to a communication device to transmit data with reduced power consumption.

BACKGROUND OF THE INVENTION

Japanese Patent Application No. 2005-160726 proposes a technique for an apparatus to sense a kinetic condition, and this apparatus is applicable to the training for appropriate walking and running, for example.

SUMMARY OF THE INVENTION

A communication device according to one aspect of the present invention includes: a first communication unit configured to communicate with an external device; a second communication unit configured to communicate with the external device, the second communication unit consuming power less than the first communication unit; a processor; and a storage unit configured to store a program that the processor executes. The processor implements processing including the following steps in accordance with a program stored in the storage unit: a selection step of selecting any type of data of a plurality of types of data; a first control step of letting the first communication unit transmit any type of data of the plurality of types of data to the external device; and a second control step of letting the second communication unit transmit the data selected by the selection step of the plurality of types of data to the external device.

DETAILED DESCRIPTION OF THE PREFERRED EMBODIMENTS

Figure 1:
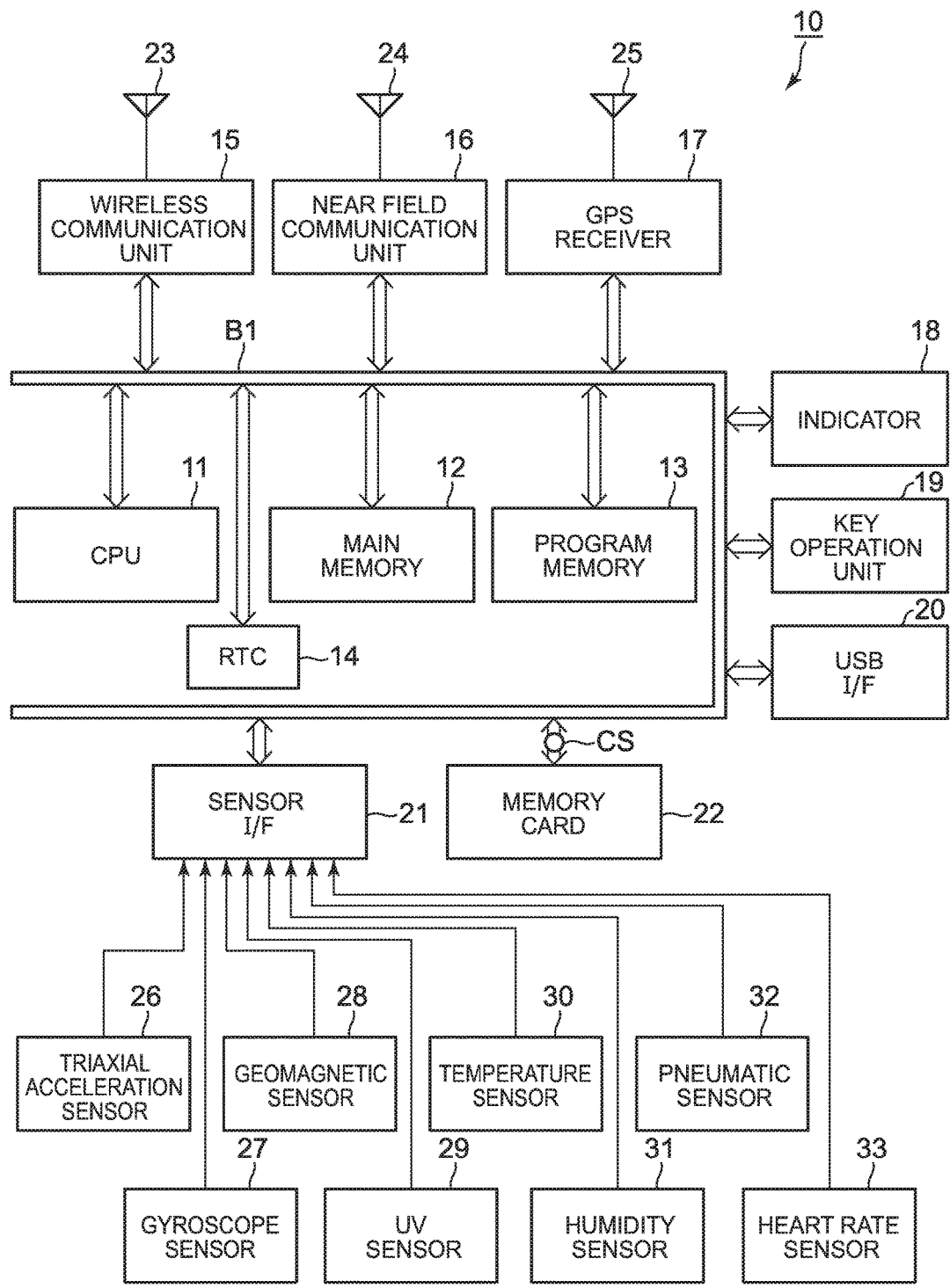
FIG. 1 is a block diagram showing the functional configuration of an electronic circuit of a wearable terminal according to one embodiment of the present invention.

Referring to the drawings, the following describes one embodiment of the present invention in details. In the following description, the present invention is applied to an action data recording system including a wearable terminal as a communication device and a smartphone as an external device to be externally connected to the communication device.

The following description assumes the case where the user wears a wearable terminal 10 of a wristwatch type, for example, during the outdoor leisure activities, such as mountaineering, trekking, cycling, and fishing, while carrying a smartphone 40 to record various types of data during the activities.

FIG. 1 is a block diagram showing the functional configuration of an electronic circuit of the wearable terminal 10. In this drawing, this wearable terminal 10 operates mainly with a CPU 11, a main memory 12 and a program memory 13.

The CPU 11 reads an operation program and various types of fixed data stored in the program memory 13 including a non-volatile memory, such as a flash memory, and decompresses and stores the program or the data into the memory 12 including a SRAM or the like. Then the CPU executes the operation program sequentially to control the operations described later.

To this CPU 11, the main memory 12, and the program memory 13, a RTC (Real Time Clock) 14, a wireless communication unit 15, a near field communication unit 16, a GPS receiver 17, an indicator 18, a key operation unit 19, a USB (Universal Serial Bus) interface (I/F) 20, a sensor interface (I/F) 21, and a memory card 22 are connected via a bus B1.

The RTC 14 is a circuit to continuously keep time on the current date and time information irrespective of ON/OFF of the power of this wearable terminal 10. When any correct value is obtained for the current time through a GPS antenna 25 and a GPS receiver 17 described later, the RTC may update the measured time.

The wireless communication unit 15 is a first communication circuit to carry out a data communication with the smartphone 40 or the like as needed via an antenna 23. The data is exchanged based on wireless LAN techniques complying with IEEE802.11a/11b/11g/11n and near field communication techniques complying with classic Bluetooth (registered trademark), for example.

The near field communication unit 16 is a circuit to always carry out a data communication with the smartphone 40 or the like via an antenna 24, and consumes less power than that in the wireless communication unit 15. The data is exchanged based on near field communication techniques complying with Bluetooth (registered trademark) LE (Low Energy), for example.

The GPS receiver 17 receives radio waves coming from a plurality of GPS satellites (not illustrated) via a GPS antenna 25, and calculates the absolute three-dimensional coordinate position (latitude/longitude/altitude) of the current position and the current time.

These GPS antenna 25 and GPS receiver 17 may be of a type that can be used with a satellite positioning system other than the GPS, such as GLONASS (GLObal NAvigation Satellite System) or Quasi-Zenith Satellite System (QZSS) that is a Japanese regional navigational satellite system. In that case, the GPS antenna and the GPS receiver may receive radio waves coming from such a satellite as well, and may calculate the absolute three-dimensional coordinates of the current position and the current time more precisely.

In that case, when the following refers to GPS positioning to describe the operation, the operation includes the positioning with such a satellite positioning system other than the GPS as well.

The indicator 18 includes a red LED (light emitting diode) and its driver, for example, and blinks/turns off in response to the ON/OFF of the operation of this wearable terminal 10.

The key operation unit 19 receives a user's manipulation with a key including a power key of this wearable terminal 10, and transmits a signal of the manipulated key to the CPU 11.

The USB interface 20 exchanges serial data with the smartphone 40 or the like via a wired connection.

The sensor interface 21 connects a triaxial acceleration sensor 26, a gyroscope sensor 27, a geomagnetic sensor 28, a UV (ultraviolet) sensor 29, a temperature sensor 30, a humidity sensor 31, a pneumatic sensor 32, and a heart rate sensor 33, for example. The sensor interface receives an output of the detection by each sensor and digitizes it as needed, and sends the result to the CPU 11.

The triaxial acceleration sensor 26 detects the acceleration along each of the three axes that are orthogonal to each other to detect the posture (including the direction of the acceleration of gravity) of the user who wears this wearable terminal 10 and the direction of external force applied.

The gyroscope sensor 27 includes a vibrating gyroscope, for example. The gyroscope sensor detects angular velocity so as to detect the change rate in posture of the terminal 10.

The geomagnetic sensor 28 includes a magnetoresistance effect device (MR sensor), for example. The geomagnetic sensor detects the direction of this wearable terminal 10 during the movement, including the magnetic north direction.

In some environments, such as indoors, the current position of the wearable terminal (i.e., the user) cannot be detected with the GPS antenna 25 and the GPS receiver 17.

Then the outputs of the detection by these triaxial acceleration sensor 26, gyroscope sensor 27 and geomagnetic sensor 28 may be combined, which allows the trace of the action by the user to be obtained in such an environment as well with consideration given to the orientation based on the autonomous navigation in the three-dimensional space.

The UV sensor 29 includes the combination of an ultraviolet transmitting filter, a light receiving element made of semiconductor, and an amplifier circuit, for example.

The temperature sensor 30 detects temperatures. The humidity sensor 31 detects humidity.

The pneumatic sensor 32 detects atmospheric pressure to detect a change in the atmospheric pressure. The detection may be combined with information on the altitude obtained from the output of the GPS receiver 17 to estimate the altitude if GPS positioning fails.

The heart rate sensor 33 includes an optical sensor to detect the pulsation at the wrist of the user who wears this wearable terminal 10, for example, and detects the heart rate of the user.

The memory card 22 is detachably attached to this wearable terminal 10 via a card slot CS. If wireless connection to the smartphone 40 fails, the memory card can record various types of data detected by the wearable terminal 10.

Figure 2:
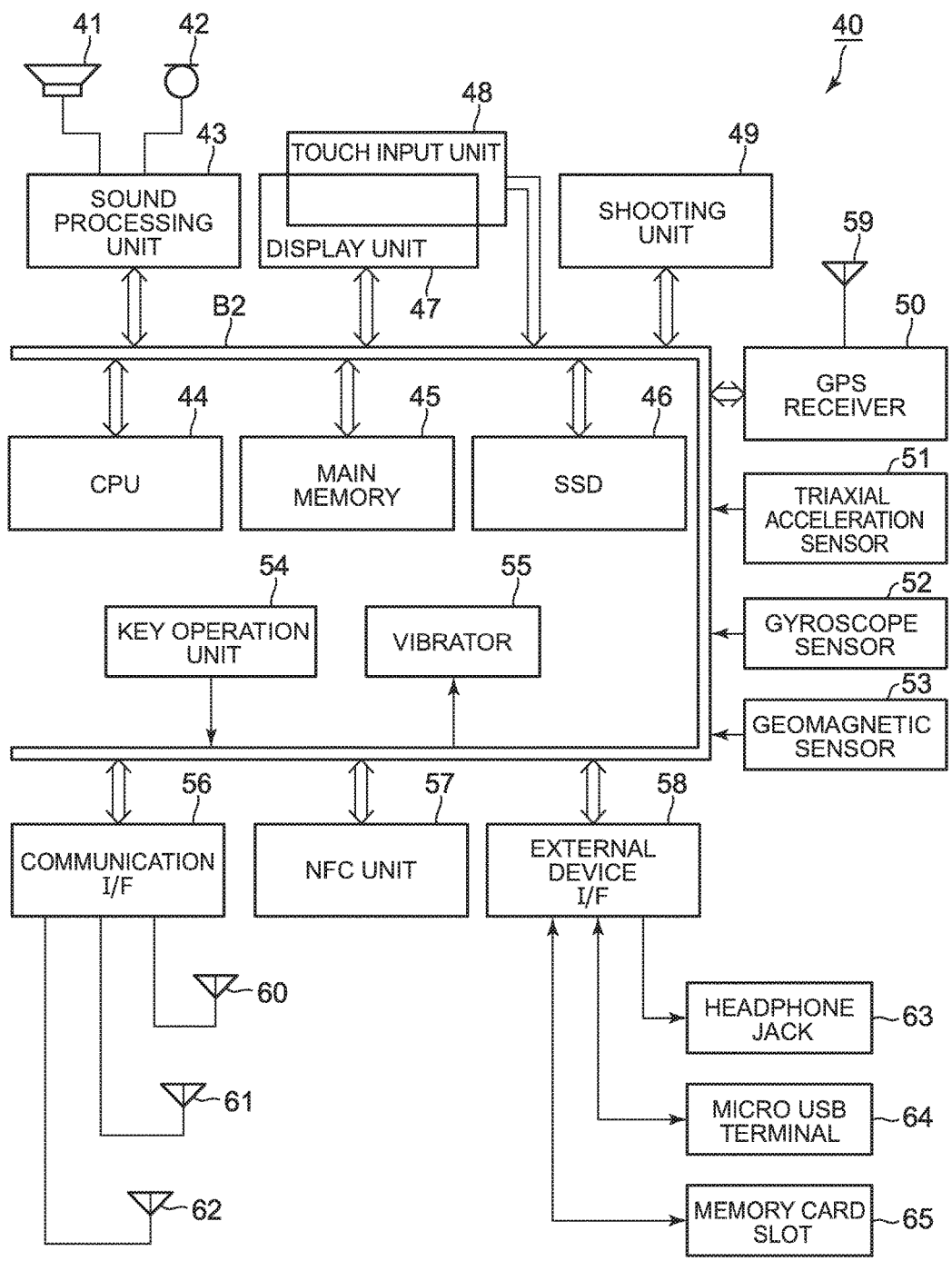
FIG. 2 is a block diagram showing the functional configuration of an electronic circuit of a smartphone according to the embodiment.

Referring next to FIG. 2, the following describes the functional configuration of the electronic circuit of the smartphone 40. As described above, the present embodiment includes the smartphone 40 as the external device to record the data that the wearable terminal 10 acquires. The smartphone may be paired with the wearable terminal 10 by a dedicated application program that is installed beforehand so as to receive and record data from the wearable terminal 10.

For this smartphone 40, reference numeral 41 denotes a speaker to output sounds and reference numeral 42 denotes a microphone to receive sounds as the input. These speaker and microphone connect to a sound processing unit 43.

During talking with this smartphone 40, the sound processing unit 43 receives sound as input by digitizing the sound input through the microphone 42, coding and compressing the data into a predetermined format and outputting the data via the bus B2. The sound processing unit also receives digital sound data obtained through a wireless communication, for example, via the bus B2, and decompresses the sound data and then changes the data to analog sound signals. Then the sound processing unit outputs the analog sound signals to the speaker 41 to issue the sounds.

The CPU 44 controls the entire operation of the smartphone 40 with a main memory 45 and a SSD (Solid State Drive) 46 that are connected via the bus B2.

The main memory 45 includes a SDRAM, for example, and serves as a work memory when the CPU 44 executes a program. The SSD 46 includes a non-volatile memory to store an OS (operating system) and various types of application programs including an application program described later as well as various types of fixed data and various types of sensor data sent from the wearable terminal 10. The CPU 44 may read out the information stored in this SSD to the main memory 45 if needed.

The bus B2 further connects to a display unit 47, a touch input unit 48, a shooting unit 49, a GPS receiver 50, a triaxial acceleration sensor 51, a gyroscope sensor 52, a geomagnetic sensor 53, a key operation unit 54, a vibrator 55, a communication interface (I/F) 56, a NFC (Near Field Communication) unit 57, and an external device interface (I/F) 58.

The display unit 47 includes a color liquid crystal panel of about 6 inches in diagonal size, for example, having a backlight, and its driving circuit. This display unit 47 is integral with the touch input unit 48 including a transparent electrode film. This touch input unit 48 digitizes the signal of coordinates in times series in response to the touch operation by the user, including a multi-touch operation. Then the touch input unit sends the digitized signal to the CPU 44 as a touch operation signal.

The shooting unit 49 includes imaging units at two positions on the surface and the rear face of the chassis of the smartphone 40, and an image processing unit to compress the image data obtained through shooting by these imaging units to be a data file.

The GPS receiver 50 receives radio waves coming from a plurality of GPS satellites (not illustrated) via a GPS antenna 59, and calculates the three-dimensional coordinates (latitude/longitude/altitude) of the current position and the current time based on the radio waves. Then the GPS receiver sends out the calculated data to the CPU 44 via the bus B2.

The triaxial acceleration sensor 51 detects the acceleration along each of the three axes that are orthogonal to each other, and can detect the posture of this smartphone 40 based on the direction of the acceleration of gravity.

The gyroscope sensor 52 includes a vibrating gyroscope.

The geomagnetic sensor 53 detects geomagnetism, and can detect the orientation of the smartphone 40 at the timing of the detection based on the direction of the magnetic north.

In some environments where the absolute current position of the user who carries and holds this smartphone 40 cannot be detected based on the outputs from the GPS antenna 59 and the GPS receiver 50, the outputs from the triaxial acceleration sensor 51, the gyroscope sensor 52 and the geomagnetic sensor 53 may be combined to analyze the action of the user, and the current position of the user can be updated by autonomous navigation through the collaboration of these triaxial acceleration sensor 51, gyroscope sensor 52 and geomagnetic sensor 53.

The key operation unit 54 includes several operation keys including a power key that is on the lateral face of the chassis of this smartphone 40, and sends out a key operation signal corresponding to the key manipulation to the CPU 44 via the bus B2.

The vibrator 55 includes a small motor and a weight that is eccentrically attached to the rotary shaft of the motor. The vibrator vibrates the smartphone 40 as a whole when the motor rotary-drives the vibrator.

The communication unit 56 wirelessly exchanges data with external devices including the wearable terminal 10 via antennas 60 to 62. The data is exchanged using a fourth-generation mobile phone, a wireless LAN system complying with IEEE802.11a/11b/11g/11n and near field communication wire complying with Bluetooth (registered trademark) and Bluetooth (registered trademark) LE, for example.

The NFC unit 57 exchanges data with an external device at a short distance and feeds power to the external device in a non-contact manner based on FeliCa (registered trademark) standard and MIFARE (registered trademark) standard.

The external device interface 58 enables connection and attachment of headphones or earphones, a USB device, and a memory card via a headphone jack 63, a micro USB terminal 64, and a memory card slot 65, respectively, for example.

The following describes the operation of the present embodiment.

The following describes the operations of both of the wearable terminal 10 and the smartphone 40 when the user wears the wearable terminal 10 while carrying the smartphone 40 and the user performs some action.

Firstly the operation of the wearable terminal 10 is described.

Figure 3:
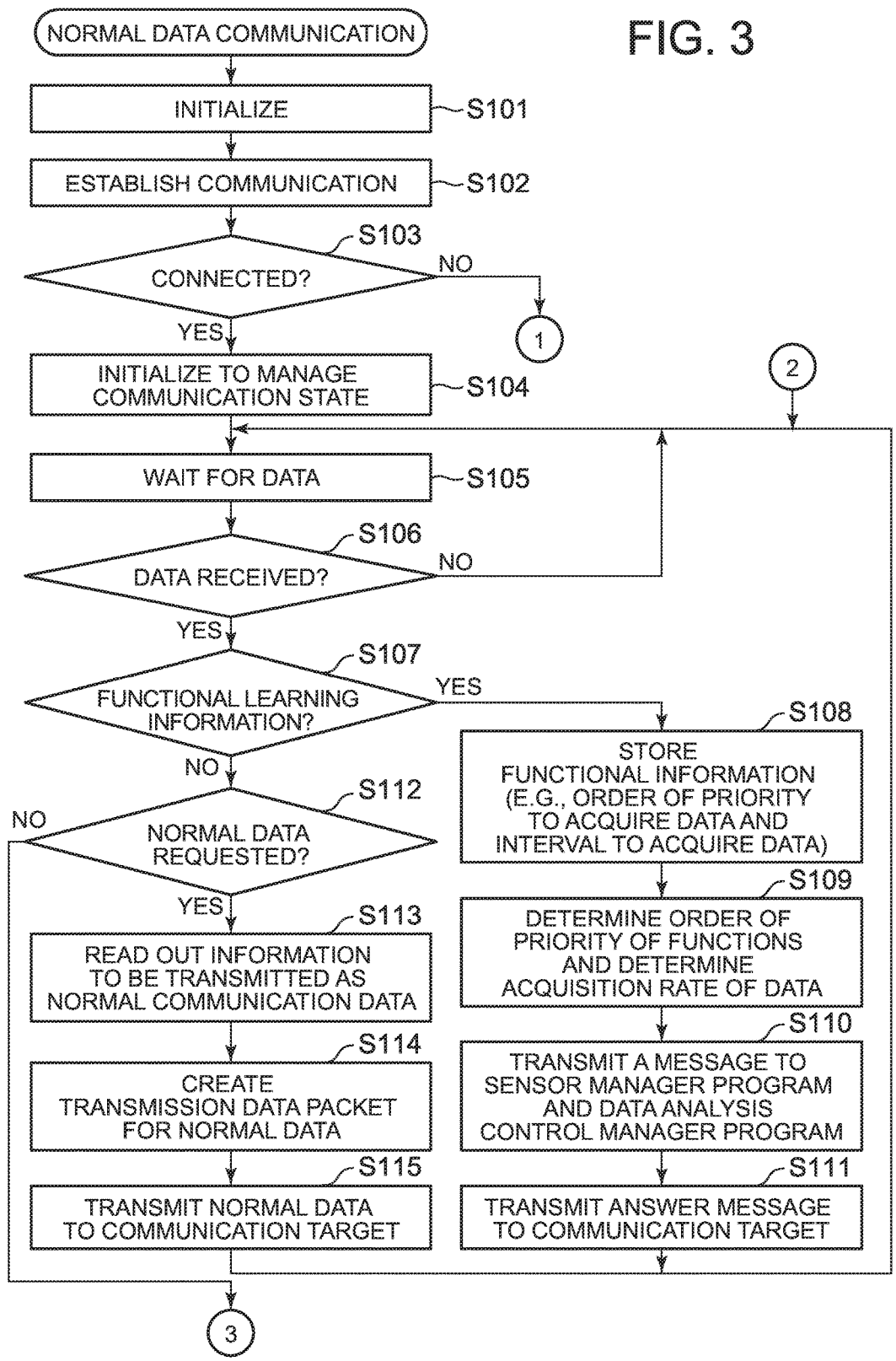
FIG. 3 is a flowchart showing the processing in a normal data communication by the wearable terminal according to the embodiment.
Figure 4:
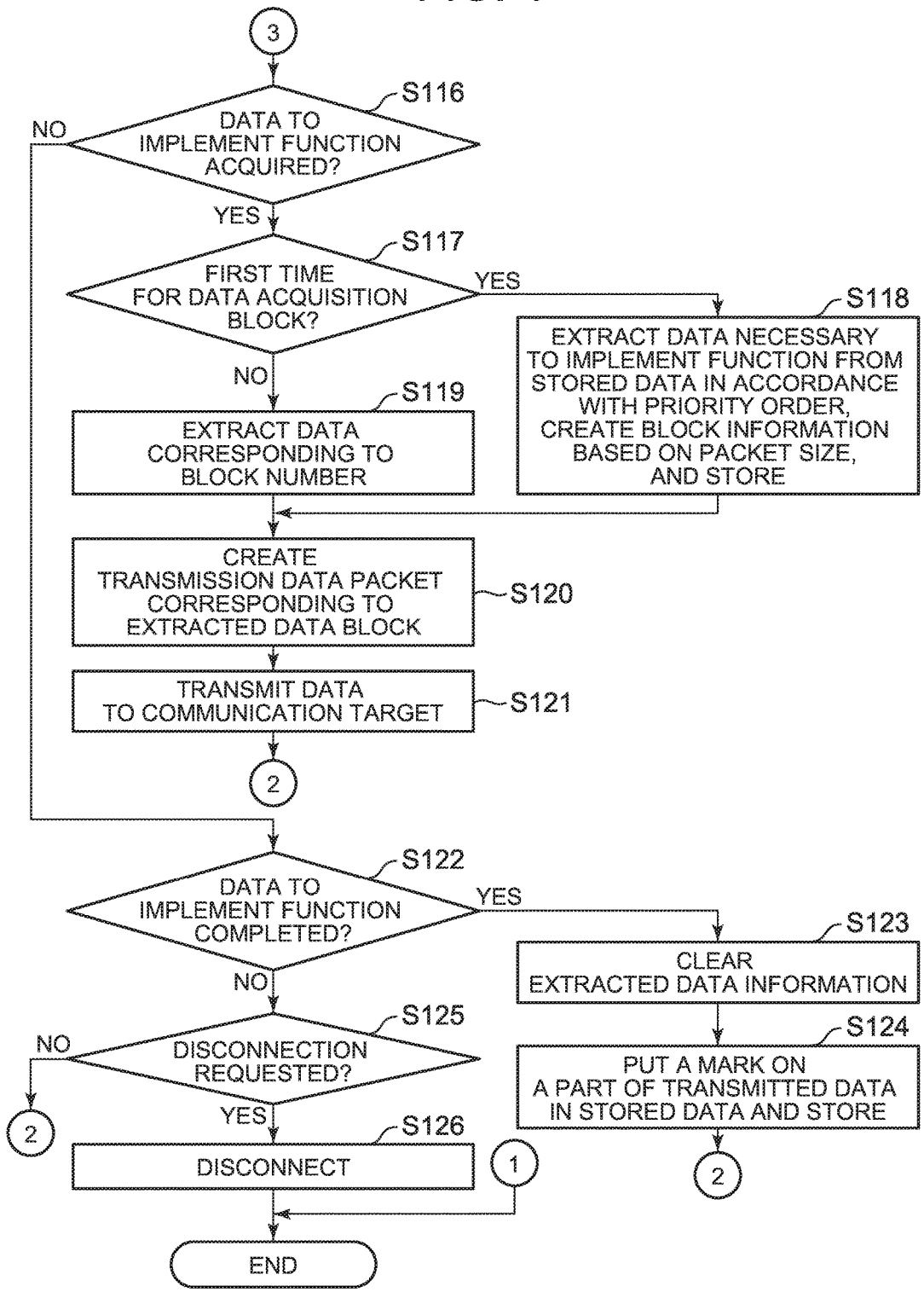
FIG. 4 is a flowchart showing the processing in a normal data communication by the wearable terminal according to the embodiment.

FIGS. 3 and 4 describe the processing of a normal data communication when the wearable terminal 10 connects to the smartphone 40 via the near field communication unit 16 with reduced power consumption and the antenna 24 to send data of a type having higher priority than predetermined priority.

At the beginning of this processing, the CPU 11 initializes various types of registers in the main memory 12 as required (Step S101), and then configures paring with the smartphone 40 based on predetermined information to establish a communication with the smartphone (Step S102).

Then the CPU 11 determines whether the connection is established successfully or not (Step S103).

If the connection fails and the CPU determines that the connection with the smartphone 40 is not established (No at Step S103), the CPU 11 ends the processing of this normal data communication.

At Step S103, when the connection is established successfully and the CPU determines that the connection with the smartphone 40 is established (Yes at Step S103), then the CPU 11 initializes various types of information to manage the communication state (Step S104).

Then the CPU 11 waits for some data coming from the smartphone 40 (Step S105) and determines whether data from the smartphone 40 is received or not (Step S106). The CPU is on standby until the smartphone 40 sends some data while repeating this processing.

When the CPU determines that some data from the smartphone 40 is received (Yes at Step S106), the CPU 11 determines whether the data is functional learning information or not that specifies the following action of the wearable terminal 10 (Step S107).

When the CPU determines that the received data is functional learning information that sets the order of priority depending on the types of the sensors (Yes at Step S107), the CPU 11 stores functional information including the order of priority to acquire data and the interval to acquire the data (Step S108).

Next, the CPU 11 determines the order of priority of the functions and determines the acquisition rate of the data (Step S109). Subsequently the CPU 11 transmits a message to a manager program and a data analysis control manager program that specify how to manage various types of sensors via the sensor interface 21, and sets the types of the sensors from which data should be transmitted as the normal communication data (Step S110).

In one example, when the user starts a running application with the smartphone 40 for running, the functional learning information places higher priority to the data of the triaxial acceleration sensor 26 and the heart rate sensor 33 that are useful for running. In another example, when the user starts a trekking application for mountaineering, the functional learning information places higher priority to the data of the pneumatic sensor 32 that is useful during mountaineering.

In accordance with such setting using the functional learning information, the sensor data read out from these sensors by the sensor interface 21 can be decompressed at a buffer region of the main memory 12 as needed and can be stored as stored data.

The CPU 11 also transmits an answer message to the smartphone 40 indicating that the functional learning information is correctly received (Step S111), and then returns to the processing from Step S105 as stated above to receive the following data.

When the CPU 11 receives a transmission request for normal data from the smartphone 40, the CPU determines that the request is not functional learning information at Step S107 after Steps S105 and S106 (No at Step S107), and determines whether this is a transmission request for normal data or not (Step S112).

In this case, the CPU determines that the smartphone 40 transmits a transmission request for normal data (Yes at Step S112). Then the CPU 11 reads out the sensor data or the like of a type that the above setting specifies it to be transmitted as the normal communication data from the buffer region of the main memory 12 (Step S113).

Then the CPU creates a transmission data packet for normal data based on the read data or the like (Step S114), and transmits and outputs the created transmission data packet to the smartphone 40 to be communicated from the near field communication unit 16 with reduced power consumption and the antenna 24 (Step S115). Then the CPU returns to the processing from Step S105 as stated above to receive the following data.

When the CPU 11 receives an acquisition request for data to implement functions from the smartphone 40, the CPU checks whether the data is an acquisition request for data to implement functions through Steps S105, S106, S107, and S112 as stated above (Step S116). When the data is an acquisition request for data to implement functions (Yes at Step S116), it is highly likely to fail the transmission of this data in one packet. Therefore the CPU 11 divides this data into a plurality of packets for transmission in the units of blocks.

More specifically the CPU 11 recognizes that it is the first time for the data acquisition block (Yes at Step S117), and then extracts data necessary to implement functions from the stored data at the buffer region in accordance with the order of priority. The CPU creates a block of the data based on the predetermined MTU (Maximum Transmission Unit) size of the packet and stores the data block once (Step S118).

In this way the CPU creates the transmission data packet corresponding to the extracted data block (Step S120), and transmits the created data transmission packet to the smartphone 40 to be communicated (Step S121).

For the data acquisition blocks of the second time or later, the CPU recognizes that it is not the first time (No at Step S117). Then the CPU extracts a data block one by one in accordance with the MTU size (Step S119), creates a transmission data packet corresponding to the extracted data block (Step S120), and transmits the created data transmission packet (Step S121).

When the transmission of the necessary number of blocks ends, the smartphone 40 sends a completion notice for the transmission request of the data to implement functions.

The CPU 11 checks whether the received data is a completion notice for the acquisition request of the data to implement functions through Steps S105, S106, S107, S112 and S116 as stated above (Step S122).

When it is the completion notice for the acquisition request of the data to implement functions (Yes at Step S122), the CPU 11 clears the data stored at the buffer region of the main memory 12 that has been transmitted (Step S123).

The CPU 11 puts a mark on a part of the data that has been transmitted in the data stored at the buffer region (Step S124). When data has a flag set, the CPU 11 may change the flag so as to indicate that the data has been transmitted. Alternatively, the CPU may have overall data management information, and may manage the data based on the information.

The CPU repeats such processing until the smartphone 40 transmits data to request a disconnection. When the CPU 11 recognizes that the received data is a disconnection request through the processing at Steps S105, S106, S107, S112, S116 and S122 as stated above (Yes at Step S125), the CPU executes disconnection processing for the normal data communication with the smartphone 40 (Step S126), and ends a series of the normal data communication using the near field communication unit 16 with reduced power consumption.

Figure 5:
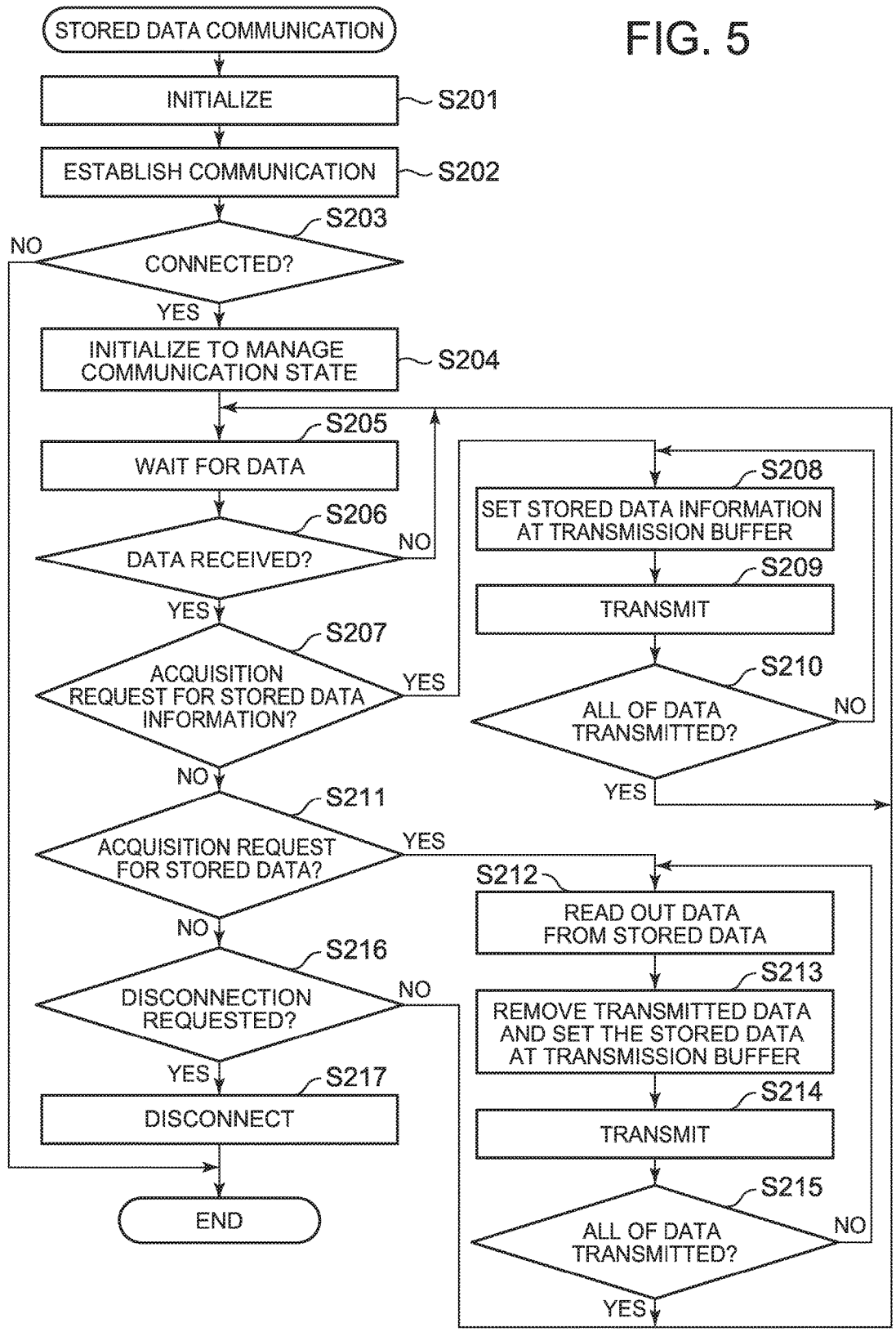
FIG. 5 is a flowchart showing the processing in a stored data communication by the wearable terminal according to the embodiment.

Referring next to FIG. 5, the following describes the processing by the wearable terminal 10 to transmit stored data to the smartphone 40 via the wireless communication unit 15 and the antenna 23.

Unlike the communication of normal data via the near field communication unit 16 and the antenna 24, the power consumption of this communication of the stored data via the wireless communication unit 15 and the antenna 23 is not low. For instance, a communication is established in response to the manual operation by the user of the smartphone 40, and then the processing is executed in a burst mode.

At the beginning of this processing, the CPU 11 initializes various types of registers in the main memory 12 as required (Step S201), and then performs communication establishing processing complying with IEEE802.11a/11b/11g/11n or classic Bluetooth (registered trademark) based on predetermined information to establish a communication with the smartphone 40 (Step S202).

Then the CPU 11 determines whether the connection is established successfully or not (Step S203).

If the connection fails and the CPU determines that the connection with the smartphone 40 is not established (No at Step S203), the CPU 11 ends the processing of the stored data communication.

At Step S203, when the connection is established successfully and the CPU determines that the connection with the smartphone 40 is established (Yes at Step S203), then the CPU 11 initializes various types of information to manage the communication state (Step S204).

Then the CPU 11 waits for some data coming from the smartphone 40 (Step S205) and determines whether data from the smartphone 40 is received or not (Step S206). The CPU is on standby until the smartphone 40 sends some data while repeating this processing.

When the CPU determines that some data from the smartphone 40 is received (Yes at Step S206), the CPU 11 determines whether the data is a request for acquisition of management information of the stored data or not (Step S207).

In this case, the CPU determines that the data sent from the smartphone 40 is a request for acquisition of management information of the stored data (Yes at Step S207). Then the CPU 11 reads out the management information of stored data held at the buffer region and sets it at a transmission buffer (Step S208), and then transmits it to the smartphone 40 to be communicated (Step S209).

After that, the CPU 11 determines whether all of the management information of stored data has been transmitted or not (Step S210). When the CPU determines that all of the management information has not been transmitted (No at Step S210), the CPU returns to Step S208 as stated above.

After repeating the processing from Steps S208 to S210 a required number of times, the CPU 11 determines that all of the management information of stored data has been transmitted (Yes at Step S210). Then, the CPU 11 returns to the processing from Step S205 as stated above to receive the following data.

When the smartphone 40 receives the management information of stored data, the smartphone designates stored data of a type that is still not received from the wearable terminal 10 based on the management information, and transmits a request for acquisition of such stored data to the wearable terminal 10.

After the CPU 11 determines at Step S207 that the data received from the smartphone 40 is not a request for acquisition of management information of stored data (No at Step S207), the CPU determines whether the data is a request for acquisition of the stored data itself or not (Step S211).

When the CPU determines that the data received from the smartphone 40 is a request for acquisition of the stored data itself (Yes at Step S211), the CPU 11 reads out the stored data of a designated type that is held at the buffer region (Step S212), removes a part of the data that has been already transmitted and then sets the resulting data at the transmission buffer (Step S213), and then transmits it to the smartphone 40 to be communicated (Step S214).

After that, the CPU 11 determines whether all of the stored data of a designated type has been transmitted or not (Step S215). When the CPU determines that all of the data has not been transmitted (No at Step S215), the CPU returns to Step S212 as stated above.

After repeating the processing from Steps S212 to S215 in this way, the CPU 11 determines that all of the stored data of the designated type to be transmitted has been transmitted (Yes at Step S215). Then, the CPU 11 returns to the processing from Step S205 as stated above to receive the following data.

After that, when receiving data to request a disconnection from the smartphone 40, the CPU 11 recognizes that the received data is a disconnection request through the processing at Steps S205, S206, S207 and S211 as stated above (Yes at Step S216). Then the CPU executes disconnection processing for the stored data communication with the smartphone 40 (Step S217), and ends a series of the stored data communication in a burst mode using the wireless communication unit 15.

Next the following describes the operation of the smartphone 40 that communicates with the wearable terminal 10.

Figure 6:
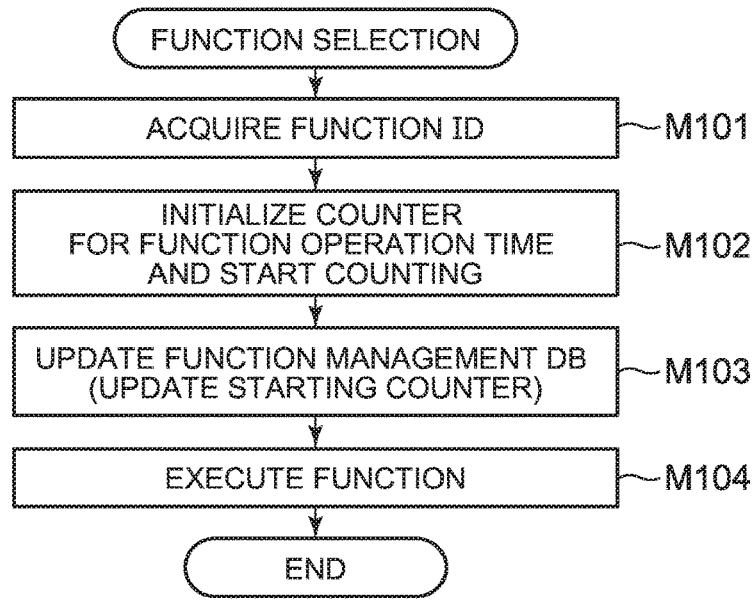
FIG. 6 is a flowchart showing the processing during a function selection operation with the smartphone according to the embodiment.

FIG. 6 shows the processing for function selection by the smartphone 40, and the CPU 44 of the smartphone performs the processing while selecting an application program targeted to the wearable terminal 10. At the beginning, the CPU 44 acquires function ID information corresponding to the selected function (Step M101). The CPU 44 initializes a counter to count the operation time of the function, and then starts the counting operation (Step M102).

After that, in order to manage the function of the wearable terminal 10, the CPU 44 updates and sets a data base region configured at the SSD 46 so as to correspond to the function selection, updates the counting operation sequentially (Step M103), and executes the function until the selected function ends (Step M104).

Figure 7:
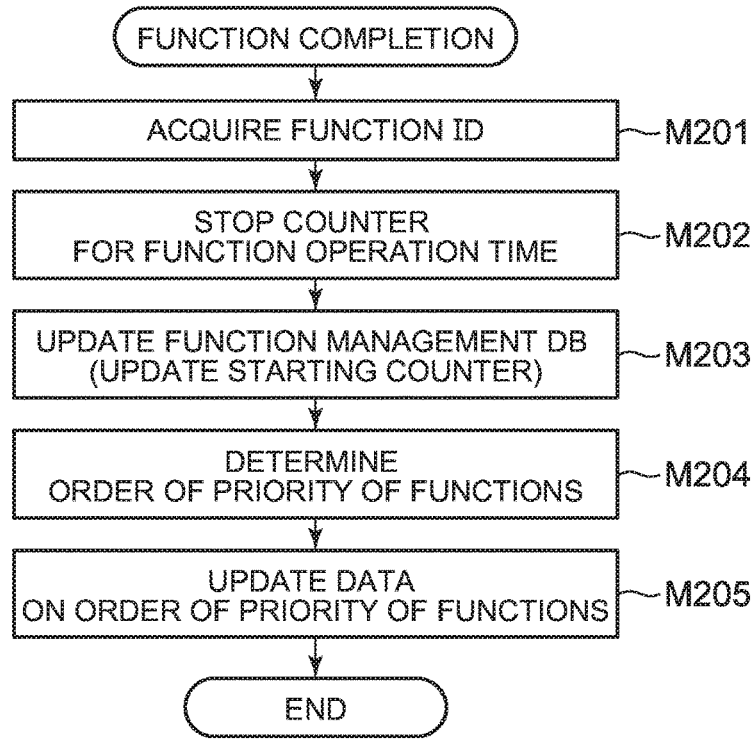
FIG. 7 is a flowchart showing the processing during the function completion with the smartphone according to the embodiment.

FIG. 7 shows the processing following the function selection as stated above, and the processing is to end the function when the time set by the counter has elapsed. At the beginning, the CPU 44 acquires function ID information corresponding to the completed function (Step M201). The CPU 44 stops the counter to count the operation time of the function (Step M202).

After that, in order to manage the function of the wearable terminal 10, the CPU 44 updates and sets the data base region configured at the SSD 46 at the timing of the completion of the function selection, and updates the counted value of the starting time (Step M203).

After completing the function, the CPU 44 determines the order of priority based on the selected function (Step M204), and updates and sets the order of priority that has been set before based on a result of the determination (Step M205). Then the CPU ends a series of processing to complete the function selection.

Figure 8:
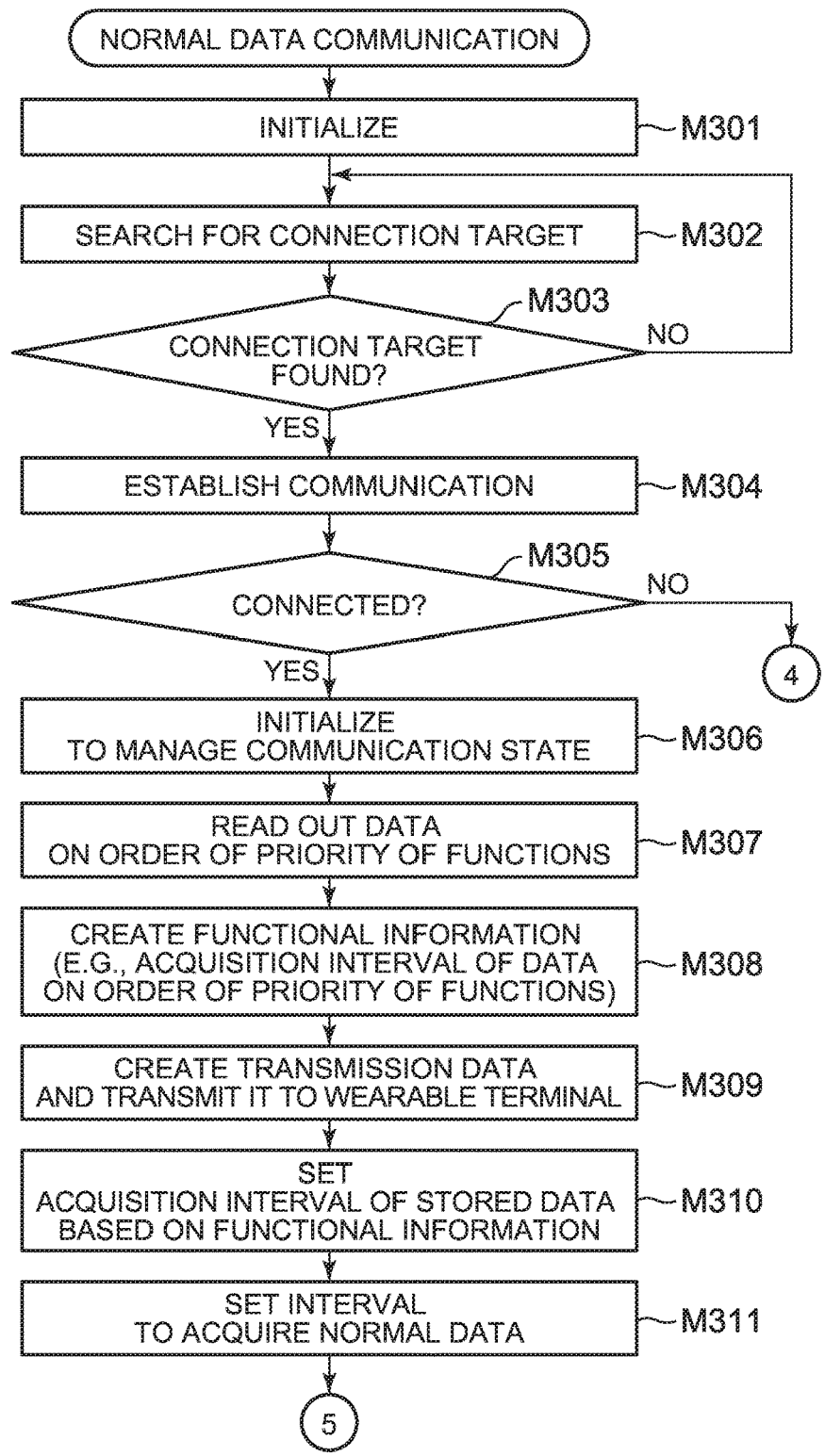
FIG. 8 is a flowchart showing the processing in a normal data communication with the smartphone according to the embodiment.
Figure 9:
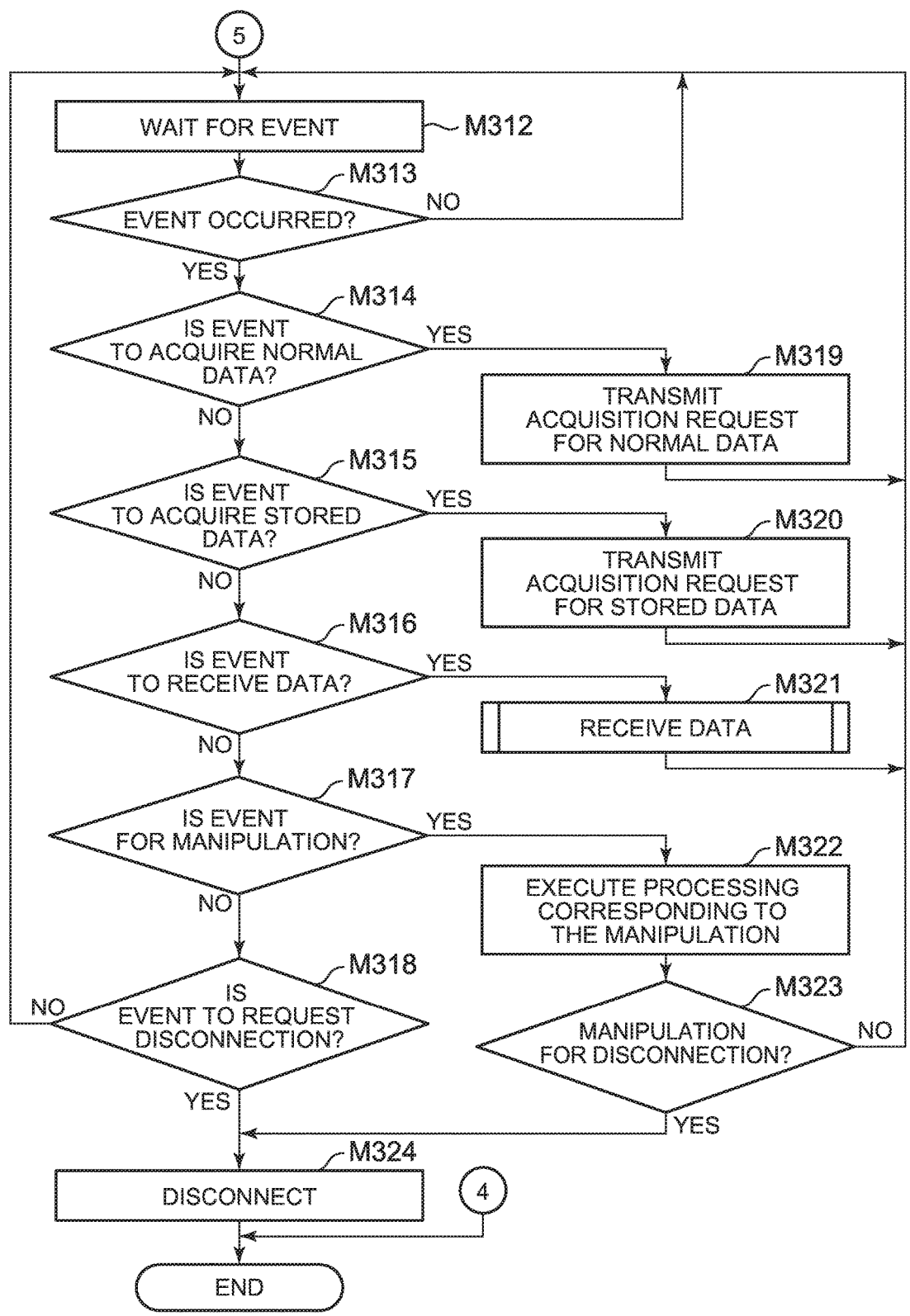
FIG. 9 is a flowchart showing the processing in a normal data communication with the smartphone according to the embodiment.

Referring next to FIGS. 8 and 9, the following describes the processing by the smartphone 40 when the smartphone carries out a communication of normal data with the wearable terminal 10. Assume that the wearable terminal 10 carries out a communication of this normal data using a Bluetooth (registered trademark) LE technique with reduced power consumption.

At the beginning of this processing, the CPU 44 initializes various types of registers in the main memory 45 as required (Step M301), and then searches for a communication target for a communication with the wearable terminal 10 (Step M302). Then the CPU determines whether any communication target can be found or not based on a result of the searching (Step M303).

When no communication target is found (No at Step M303), the CPU 44 returns to the processing at Step M302 to continue the searching.

In this way, the CPU repeats the processing at Steps M302 and M303 until any communication target can be found.

When a communication target can be found (Yes at Step M303), the CPU 44 configures paring with the communication target based on predetermined information (Step M304).

Then the CPU 44 determines whether the connection is established successfully or not (Step M305).

If the connection fails and the CPU determines that the connection with the wearable terminal 10 is not established (No at Step M305), the CPU 44 ends the processing of this normal data communication.

At Step M305, when the connection is established successfully and the CPU determines that the connection with the wearable terminal 10 can be established (Yes at Step M305), then the CPU 44 initializes various types of information to manage the communication state (Step M306).

The CPU 44 then reads out the data with the order of priority of the function that is selected at the processing of FIG. 6 to be transmitted to the wearable terminal 10 (Step M307), and creates function information (Step M308). The function information created here is a group of data including the priority order of functions and the acquisition interval of data, for example, which specifies how to extract data used for a function having higher priority.

The CPU 44 creates transmission data based on the created function information, and transmits it to the wearable terminal 10 (Step M309).

The CPU 44 also extracts the acquisition interval of the stored data from the function information and sets it as event timing described later (Step M310). The smartphone requests the acquisition of stored data from the wearable terminal 10 at the period of this interval.

Similarly the CPU 44 extracts the acquisition interval of normal data from the function information and sets it at event timing described later (Step M311). The smartphone requests the acquisition of normal data from the wearable terminal 10 at the period of this interval.

After finishing the setting in this way, the CPU 44 shifts to an event waiting state (Step M312), and determines whether any event occurs or not (Step M313). The CPU is on standby waiting for the timing of occurrence of any event while repeating this processing.

When the CPU determines that any event occurs (Yes at Step M313), then the CPU 44 sequentially determines whether the event requests acquisition of normal data (Step M314), whether the event requests acquisition of stored data (Step M315), whether the event is to receive data from the wearable terminal 10 (Step M316), whether the event encourages the user of this smartphone 40 to input data using the touch input unit 48 or the key operation unit 54 (Step M317), and whether the event requests a disconnection (Step M318).

When the data does not correspond to any of them (No at Step M318), the CPU considers that a result of the determination as timing of the event occurrence is a NOP (no operation) command, and then returns to the processing from Step M312 as stated above to be ready for the timing of the following event occurrence.

At Step M314 as stated above, when the CPU determines that the event requests acquisition of normal data (Yes at Step M314), the CPU 44 transmits a signal to demand the acquisition of normal data from the wearable terminal 10 to the wearable terminal 10 (Step M319), and returns to the processing from Step M312.

At Step M315 as stated above, when the CPU determines that the event requests acquisition of stored data (Yes at Step M315), the CPU 44 transmits a signal to demand the acquisition of stored data from the wearable terminal 10 to the wearable terminal 10 (Step M320), and returns to the processing from Step M312.

At Step M316 as stated above, when the CPU determines that the event is to receive data from the wearable terminal 10, then the wearable terminal 10 will transmit any one of normal data and stored data in response to the acquisition request. Then the CPU 44 executes receiving processing of the data transmitted (Step M321), and returns to the processing from Step M312.

Figure 10:
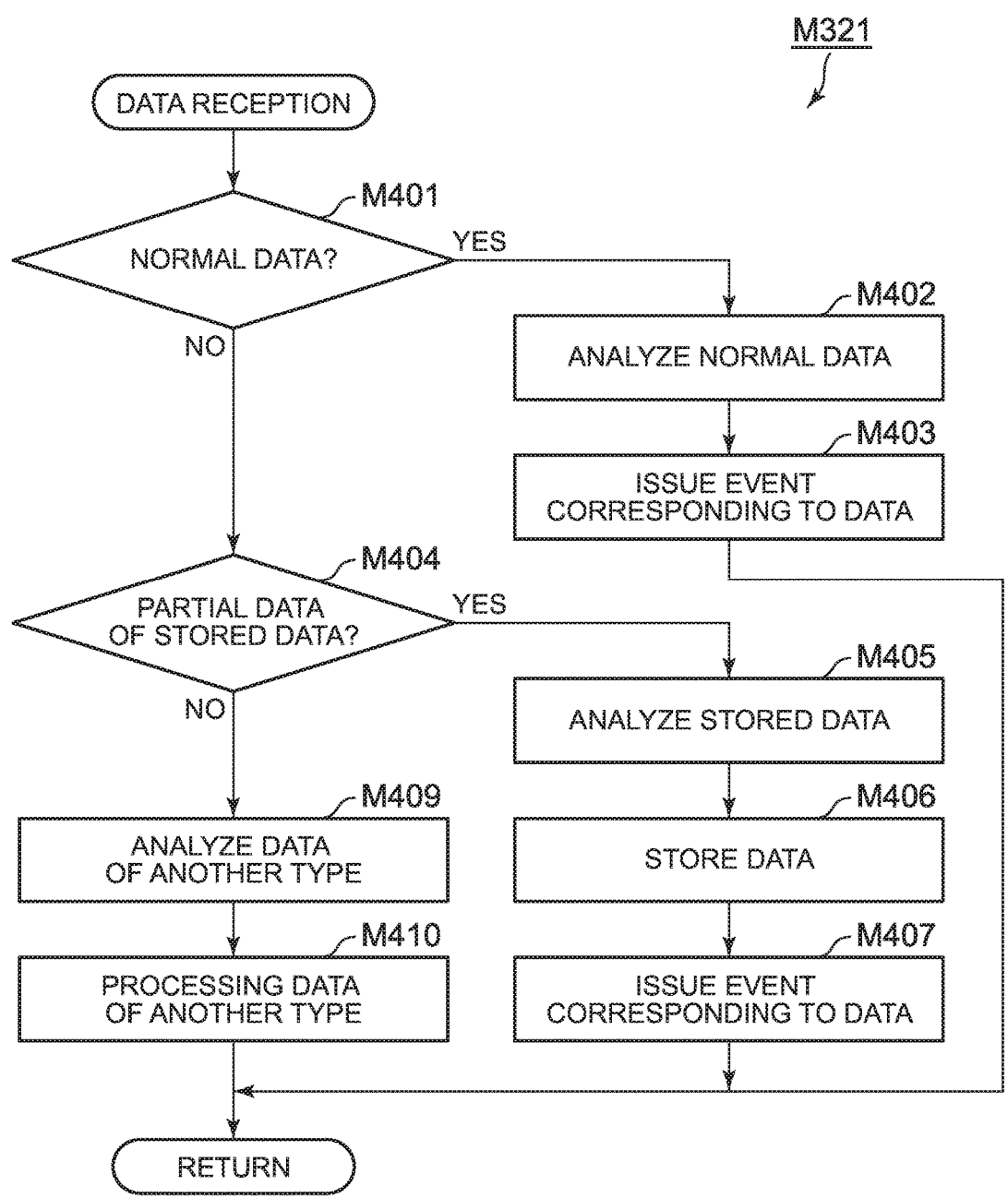
FIG. 10 is a flowchart showing the processing in a subroutine of the data reception in FIG. 9 with the smartphone according to the embodiment.

FIG. 10 is a flowchart of a subroutine to describe the data receiving processing at Step M321 in more details. At the beginning of this processing, the CPU 44 determines whether the data received is normal data or not (Step M401).

When the CPU determines that the data received is normal data (Yes at Step M401), the CPU 44 executes analysis processing of the received data (Step M402). Then the CPU issues an event configured beforehand in accordance with a result of the analysis (Step M403).

This includes the case where if the remaining battery level of the wearable terminal 10 changes, the display unit 47 and the vibrator 55 display and output as such or update the displayed information, for example.

At Step M401, when the CPU determines that the data received is not normal data (No at Step M401), then the CPU 44 determines whether the received data is partial data of the stored data or not (Step M404).

When the CPU determines that the data received is partial data of the stored data (Yes at Step M404), the CPU 44 analyzes the stored data (Step M405) and stores the data in the SSD 46. Then the CPU executes merge processing of the data with other partial data of the stored data that is already stored if needed (Step M406), and issues an event configured beforehand in accordance with a result of the analysis (Step M407).

At Step M404, when the CPU determines that the data received is not partial data of the stored data (No at Step M404), then the CPU considers that the received data is neither normal data nor stored data. The CPU 44 then executes analysis processing of data of another type (Step M409).

Next the CPU 44 executes different data processing corresponding to the result of analysis (Step M410), and ends the processing of this subroutine. Then the CPU returns to the processing from Step M312 in FIG. 9.

The data of another type as stated above may include an operation command corresponding to a key operation with the wearable terminal 10 and data depending on the specifications of the wearable terminal 10.

At Step M317 of FIG. 9, when the CPU determines that the event encourages the user of this smartphone 40 to input data with the touch input unit 48 or the key operation unit 54 (Yes at Step M317), the CPU 44 executes the processing corresponding to the manipulation by the user (Step M322).

Then the CPU 44 determines whether the user's manipulation requests a disconnection of the communication with the wearable terminal 10 or not (Step M323).

When the CPU determines that the user's manipulation does not request a disconnection of the communication with the wearable terminal 10 (No at Step M323), the CPU returns to the processing from Step M312.

At Step M323 as stated above, when the CPU determines that the user's manipulation requests a disconnection of the communication with the wearable terminal 10 (Yes at Step M323), and at Step M318, when the CPU determines that the event requests a disconnection (Yes at Step M318), the CPU 44 executes disconnection processing of the normal data communication with the wearable terminal 10 (Step M324), and ends a series of normal data communication.

Figure 11:
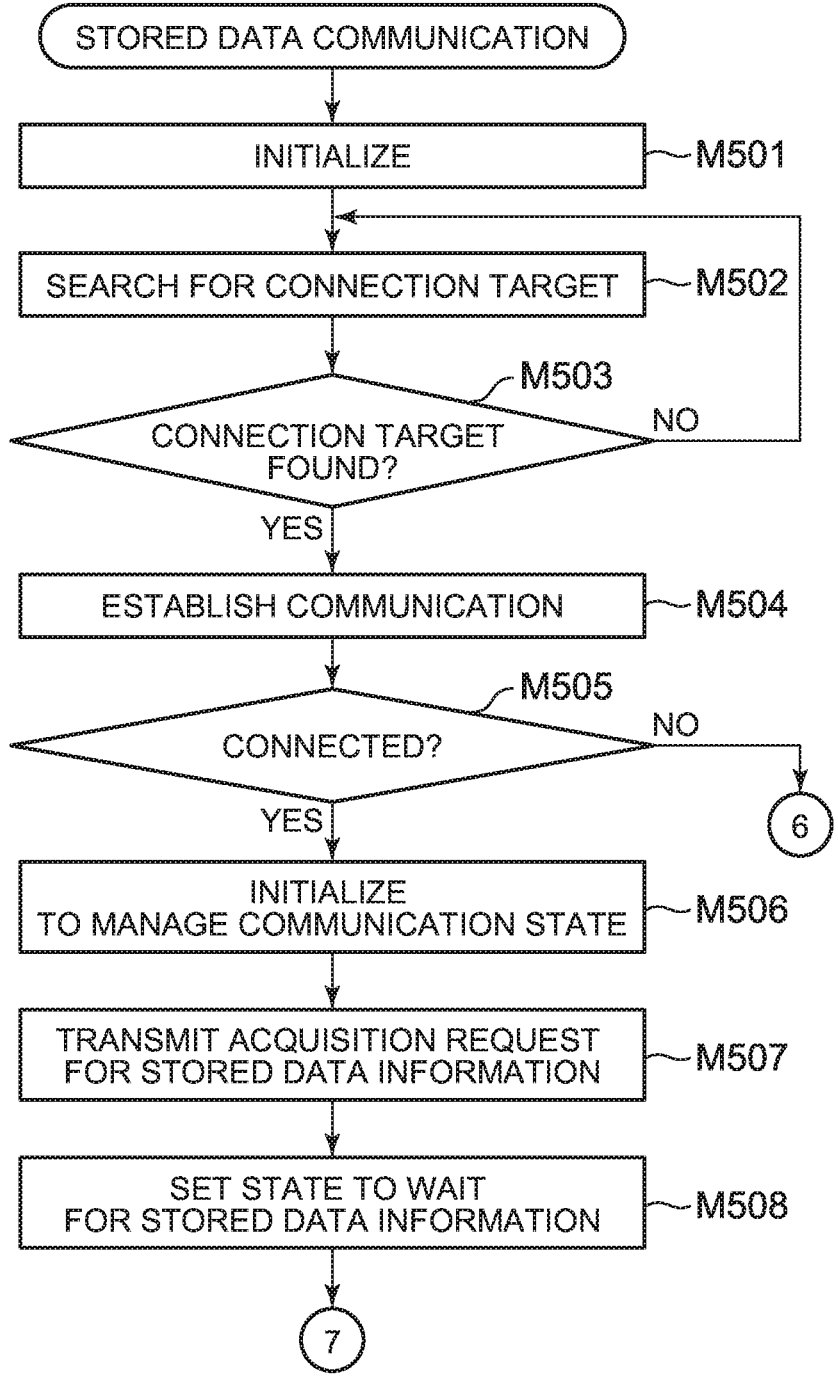
FIG. 11 is a flowchart showing the processing in a stored data communication with the smartphone according to the embodiment.
Figure 12:
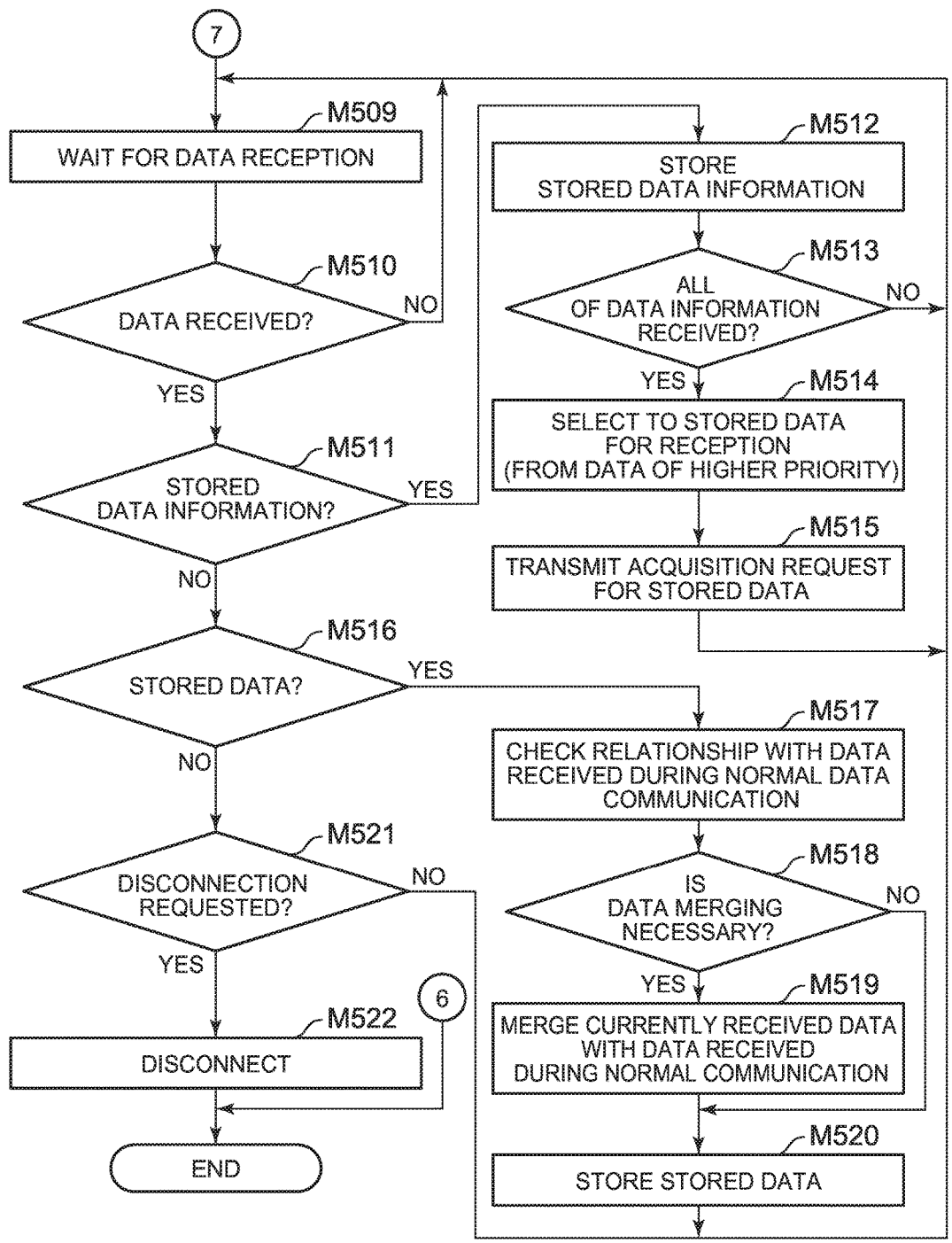
FIG. 12 is a flowchart showing the processing in a stored data communication with the smartphone according to the embodiment.

Referring next to FIGS. 11 and 12, the following describes the processing by the smartphone 40 when the smartphone performs a communication of stored data with the wearable terminal 10.

At the timing of an event to request acquisition of stored data by the smartphone 40 as stated above, the CPU 44 initializes various types of registers in the main memory 45 as required (Step M501), and then searches for a communication target for a communication with the wearable terminal 10 (Step M502). Then the CPU determines whether any communication target can be found or not as a result of the searching (Step M503).

When no communication target is found (No at Step M503), the CPU 44 returns to the processing at Step M502 to continue the searching.

In this way, the CPU repeats the processing at Steps M502 and M503 until any communication target can be found.

When a communication target can be found (Yes at Step M503), the CPU 44 configures a communication with the communication target based on predetermined information to establish a communication state (Step M504).

Then the CPU 44 determines whether the connection is established successfully or not (Step M505).

If the connection fails and the CPU determines that the connection with the wearable terminal 10 is not established (No at Step M505), the CPU 44 once ends the processing of this stored data communication.

At Step M505, when the connection is established successfully and the CPU determines that the connection with the wearable terminal 10 can be established (Yes at Step M505), then the CPU 44 initializes various types of information to manage the communication state (Step M506).

Then the CPU 44 transmits an acquisition request of the management information of stored data to the wearable terminal 10 (Step M507), and configures a state of waiting for the transmission of the management information of stored data from the wearable terminal 10 in response to the acquisition request (Step M508).

Then the CPU 44 waits for some data coming from the wearable terminal 10 (Step M509) and determines whether data from the wearable terminal 10 is received or not (Step M510). The CPU is on standby until the wearable terminal 10 sends some data while repeating this processing.

When the CPU determines that some data from the wearable terminal 10 is received (Yes at Step M510), the CPU 44 sequentially determines whether the data is the management information of stored data or not (Step M511), whether the data is stored data itself or not (Step M516), and whether the data is a signal to request a disconnection or not (Step M521).

When the data does not correspond to any of them (No at Step M521), the CPU considers that a result of the determination of the data reception is a NOP command, and then returns to the processing from Step M509 as stated above to receive the following data.

At Step M511, when the CPU determines that the data received is management information of stored data (Yes at Step M511), the CPU 44 stores the management information of the stored data that should have been divided and transmitted (Step M512), and then determines whether all of the management information of the stored data has been received or not (Step M513).

When the CPU determines that all of the management information of stored data has not been transmitted (No at Step M513), then the CPU 44 returns to the processing from Step M509 as stated above to further receive the remaining management information of the stored data.

At Step M513, when the CPU determines that all of the management information of stored data has been received (Yes at Step M513), the CPU 44 makes a selection to receive the stored data of a type having higher priority in the stored data based on the management information of stored data received (Step M514).

Then the CPU transmits a request signal to acquire the stored data of the selected type to the wearable terminal 10 (Step M515), and returns to the processing from Step M509 as stated above so as to be ready for the transmission of stored data from the wearable terminal 10 in response to the request signal.

At Step M516, when the CPU determines that the data received is the stored data itself (Yes at Step M516), then the CPU 44 checks a relationship with the data received during the normal data communication (Step M517). Then the CPU determines based on a result of the checking whether marge processing is required or not between the received stored data and the data that has been received during the normal data communication (Step M518).

When the CPU determines that marge processing is required between the received stored data and the data that has been received during the normal data communication (Yes at Step M518), the CPU 44 executes marge processing of both of the data (Step M519).

At Step M518, when the CPU determines that marge processing is not required between the received stored data and the data that has been received during the normal data communication (No at Step M518), the CPU does not execute the processing at Step M519.

After that, the CPU 44 executes storage processing of the received stored data irrespective of whether or not the marge processing is executed (Step M520), and then the CPU returns to the processing from M509 to receive the following data.

At Step M521 as stated above, when the CPU determines that the received data is a disconnection request (Yes at Step M521), then the CPU executes disconnection processing of the stored data communication with the wearable terminal 10 (Step M522). Then the CPU ends a series of stored data communication in a burst mode with the wearable terminal 10.

The present embodiment as described above in details allows the output of various types of sensors of the wearable terminal 10 to be used effectively and can provide necessary information to the user with the smartphone 40 as needed. The present embodiment also can realize long operation time by reducing power consumption as low as possible.

The embodiment as described above is configured to divide data having a function set and store the data at a redundant region of data transmitted from the wearable terminal 10 during a normal data communication depending on the order or priority. This can improve the data communication efficiency for the communication unit with reduced power consumption, and so the power consumption at the wearable terminal 10 can be reduced more.

The wearable terminal has a small and lightweight chassis because it is directly attached to the body of the user, and so it is difficult for the wearable terminal to have a lot of keys or the like, so that the operability of the wearable terminal is limited. Instead of such a wearable terminal 10, the smartphone 40 as the external device having a higher degree of freedom for key manipulations sets the order or priority, and so this enables optimum and diverse setting of the order of priority.

In the embodiment as stated above, some parts of the stored data are not transmitted during the normal data communication because of their lower order of priority. These parts of data are collected and transmitted collectively in a burst mode using a communication unit consuming power more but having higher data transfer capacity. This can reduce the overall power consumption required for data transmission in combination with the normal data communication to transmit the necessary data amount.

The above embodiment illustrates the types of the sensors of the wearable terminal 10 and the smartphone 40 as the external device as just one example. The present invention is not limited to the above embodiment.

In the above embodiment, various types of data that the wearable terminal 10 transmits may be the output of various types of sensors, one or plurality of data created from the output of one sensor, or one or plurality of data created from the output of a plurality of sensors.

The above embodiment is configured so that data of a type having higher priority than predetermined priority only is transmitted to the smartphone 40 via the near field communication unit 16 with reduced power consumption and the antenna 24. Instead, data of a type having lower priority than predetermined priority only is transmitted to the smartphone 40 via the near field communication unit 16 with reduced power consumption and the antenna 24.

In the above embodiment, priority is set for a plurality of types of data. Alternatively, one type of data may be set as specific data, and this data may be transmitted to the smartphone 40 via the near field communication unit 16 with reduced power consumption and the antenna 24.

In the above embodiment, the order of priority of data acquisition and the acquisition interval of data are set based on the functional learning information that the smartphone 40 sends. Alternatively, the order of priority of data acquisition and the acquisition interval of data may be set manually by the user with the wearable terminal 10.

The user's action may be estimated from data of various types of sensors of the wearable terminal 10, and the order of priority of data acquisition and the acquisition interval of data may be set based on the estimated action.

The present invention is not limited to the above embodiment, and may be modified variously for implementation without departing from the scope of the invention. The embodiments may be combined for implementation as needed, and the combined effect can be obtained in this case. The embodiments include various aspects of the invention, and various aspects of the invention can be extracted by selecting and combining a plurality of constituent elements in the disclosure. For example, some elements may be deleted from the constituent elements disclosed in the embodiments. Such a configuration after the deletion also can be extracted as the invention as long as the configuration can solve the problems and have the advantageous effects as mentioned above.

The invention claimed is:

1. A communication device, comprising:
   a first communication unit configured to communicate with an external device;
   a second communication unit configured to communicate with the external device, the second communication unit consuming power less than the first communication unit;
   a processor; and
   a storage unit configured to store a program that the processor executes,
   wherein the processor implements processing in accordance with the program stored in the storage unit to perform operations including:
   a selection step of selecting a type of data from a plurality of types of data;
   a first control step of controlling the first communication unit to transmit data of the plurality of types of data to the external device; and
   a second control step of dividing data of the selected type, storing the divided data at a redundant region of a data communication packet during a normal data communication that the communication device carries out with the external device, and controlling the second communication unit to transmit the data communication packet to the external device.

2. The communication device according to claim 1, wherein in the selection step, the external device selects any type of data from the plurality of types of data.

3. The communication device according to claim 2, wherein the selection step selects any type of data from the plurality of types of data based on information that the first communication unit or the second communication unit receives from the external device.

4. The communication device according to claim 1, wherein in the selection step, the communication device selects any type of data from the plurality of types of data.

5. The communication device according to claim 1, wherein in the first control step, the first communication unit transmits data of the plurality of types of data other than the selected type to the external device.

6. The communication device according to claim 1, wherein the selection step sets priority to the plurality of types of data, and selects a data type having a higher priority than a predetermined priority or a data type having a lower priority than the predetermined priority.

7. The communication device according to claim 6, wherein in the second control step, the second communication unit transmits data of the selected data type having the higher priority than the predetermined priority or having the lower priority than the predetermined priority to the external device.

8. A communication method for a communication device, the communication device including a first communication unit configured to communicate with an external device and a second communication unit configured to communicate with the external device, the second communication unit consuming power less than the first communication unit, and the communication method comprising:
   a selection step of selecting a type of data from a plurality of types of data;
   a first control step of controlling the first communication unit to transmit data of the plurality of types of data to the external device; and
   a second control step of dividing data of the selected type, storing the divided data at a redundant region of a data communication packet during a normal data communication that the communication device carries out with the external device, and controlling the second communication unit to transmit the data communication packet to the external device.

9. The communication method according to claim 8, wherein in the selection step, the external device selects any type of data from the plurality of types of data.

10. The communication method according to claim 9, wherein in the selection step, any type of data is selected from the plurality of types of data based on information that the first communication unit or the second communication unit receives from the external device.

11. The communication method according to claim 8, wherein in the selection step, the communication device selects any type of data from the plurality of types of data.

12. The communication method according to claim 8, wherein in the first control step, the first communication unit transmits data of the plurality of types of data other than the selected type to the external device.

13. The communication method according to claim 8, wherein the selection step sets priority to the plurality of types of data, and selects a data type having a higher priority than a predetermined priority or a data type having a lower priority than the predetermined priority.

14. The communication method according to claim 13, wherein in the second control step, the second communication unit transmits data of the selected data type having the higher priority than the predetermined priority or having the lower priority than the predetermined priority to the external device.

15. A computer readable recording medium having stored thereon a program executed by a computer of a communication device, the communication device including a first communication unit configured to communicate with an external device and a second communication unit configured to communicate with the external device, the second communication unit consuming power less than the first communication unit, and the program controlling the computer to perform operations comprising:
   selecting a type of data from a plurality of types of data;
   controlling the first communication unit to transmit data of the plurality of types of data to the external device; and
   dividing data of the selected type, storing the divided data at a redundant region of a data communication packet during a normal data communication that the communication device carries out with the external device, and controlling the second communication unit transmit the data communication packet to the external device.

* * * * *